United States Patent [19]
Ettridge

[11] 4,294,464
[45] Oct. 13, 1981

[54] CHILD'S STROLLER

[76] Inventor: John P. Ettridge, 235 Diagonal Rd., Warradale, Australia, 5046

[21] Appl. No.: 11,794

[22] Filed: Feb. 14, 1979

[30] Foreign Application Priority Data

Feb. 17, 1978 [AU] Australia .............................. PD3427

[51] Int. Cl.³ .............................................. B62B 7/06
[52] U.S. Cl. .................................... 280/649; 280/650
[58] Field of Search ............... 280/647, 649, 650, 655; 188/20, 74

[56] References Cited

U.S. PATENT DOCUMENTS

| | | | |
|---|---|---|---|
| 1,731,312 | 10/1929 | Matheson | 188/74 |
| 1,810,428 | 6/1931 | Lazzeri | 188/20 |
| 2,873,820 | 2/1959 | Rizzuto | 188/20 |

FOREIGN PATENT DOCUMENTS

| | | | |
|---|---|---|---|
| 221593 | 10/1958 | Australia | 280/650 |
| 28076 | 7/1921 | Denmark | 280/647 |
| 263590 | 6/1912 | Fed. Rep. of Germany | 280/650 |
| 66100 | 12/1925 | Sweden | 280/650 |

*Primary Examiner*—Randolph A. Reese
*Assistant Examiner*—D. W. Underwood
*Attorney, Agent, or Firm*—Oldham, Oldham, Hudak & Weber Co.

[57] ABSTRACT

A child's stroller, pusher, pram which folds into a compact unit. The handle, seat, frame and undercarriage are interconnected by a linkage so that the components fold down towards the wheels as the wheels move towards each other.

6 Claims, 9 Drawing Figures

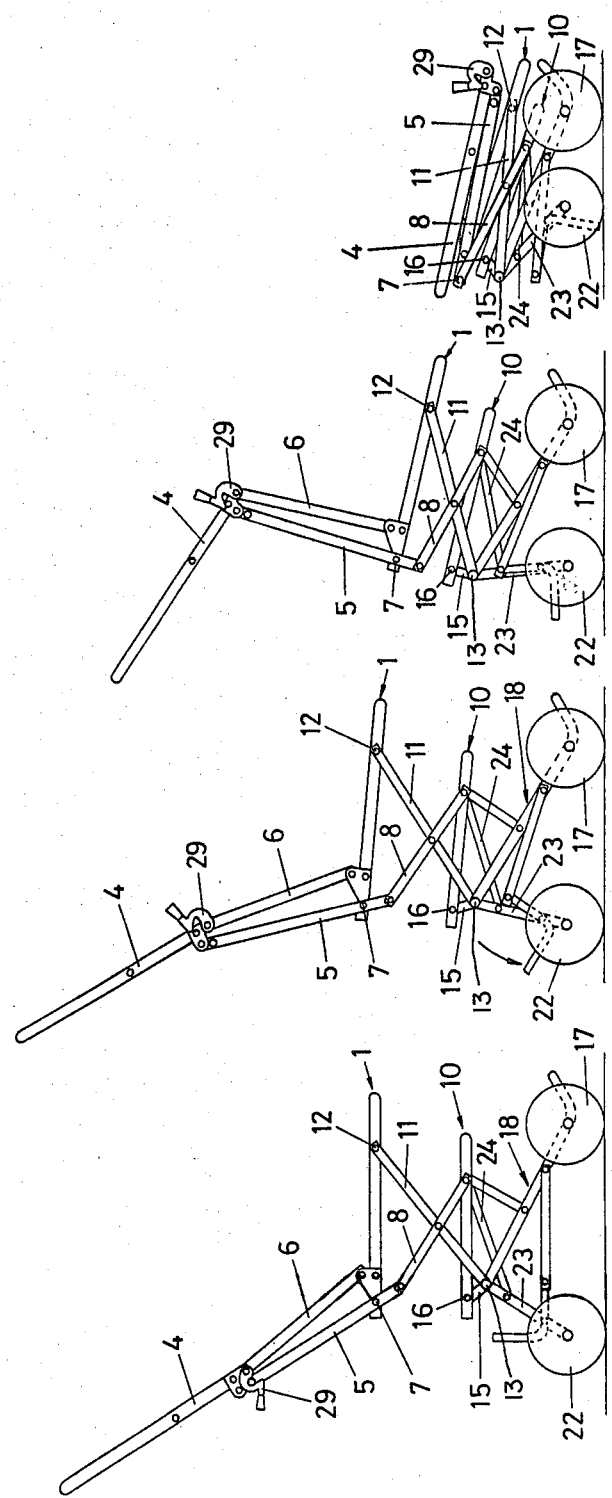

CHILD'S STROLLER

This invention relates to a folding child's carriage or stroller.

FIELD OF INVENTION

Folding strollers are well known, and while many of them fold to a fairly convenient size, they often do not readily fold into a small compact unit which can be easily carried and/or stored. Also it is often desirable that the strollers be carried by a car or the like, and if it can be folded into a small package or volume, then it can be more easily stowed in the car, for example in the boot, or inside the car between the seats or the like.

DESCRIPTION OF PRIOR ART

One type of folding stroller is shown in Australian Pat. No. 493,928 which shows a stroller or folding baby carriage which folds into a long compact package. However this still has, when folded, a length approximating the length from the handle to the front wheels. This long folded unit has the disadvantages due to this length when folded.

BRIEF DESCRIPTION OF THE INVENTION

It is an object of this invention to provide a stroller which can be folded into a small compact unit, and which can be easily carried by a person.

Thus there is provided according to the invention an improved child's stroller comprising an upper horizontal frame and beneath that a horizontal seat frame, these frames being connected by a pantograph linkage, with the handle being articulated and connected both to the upper frames and to an upper leg of the pantograph linkage, the seat frame carrying frameworks for the wheels, the rear wheel frame being connected to the lower end of the pantograph frame and connected by linkages to the seat frame, so that on folding of the handle portions forwardly over the upper frame, that the upper frame and seat frame both move slightly forwardly, which forward movement draws the rear wheels forwardly to be adjacent the front wheels so that the whole unit collapses downwardly into a small compact unit.

BRIEF DESCRIPTION OF THE DRAWINGS

FIGS. 2 to 5 show in side elevation the stroller in various stages from erected to folded condition.

DESCRIPTION OF THE PREFERRED EMBODIMENT

Figure 1:
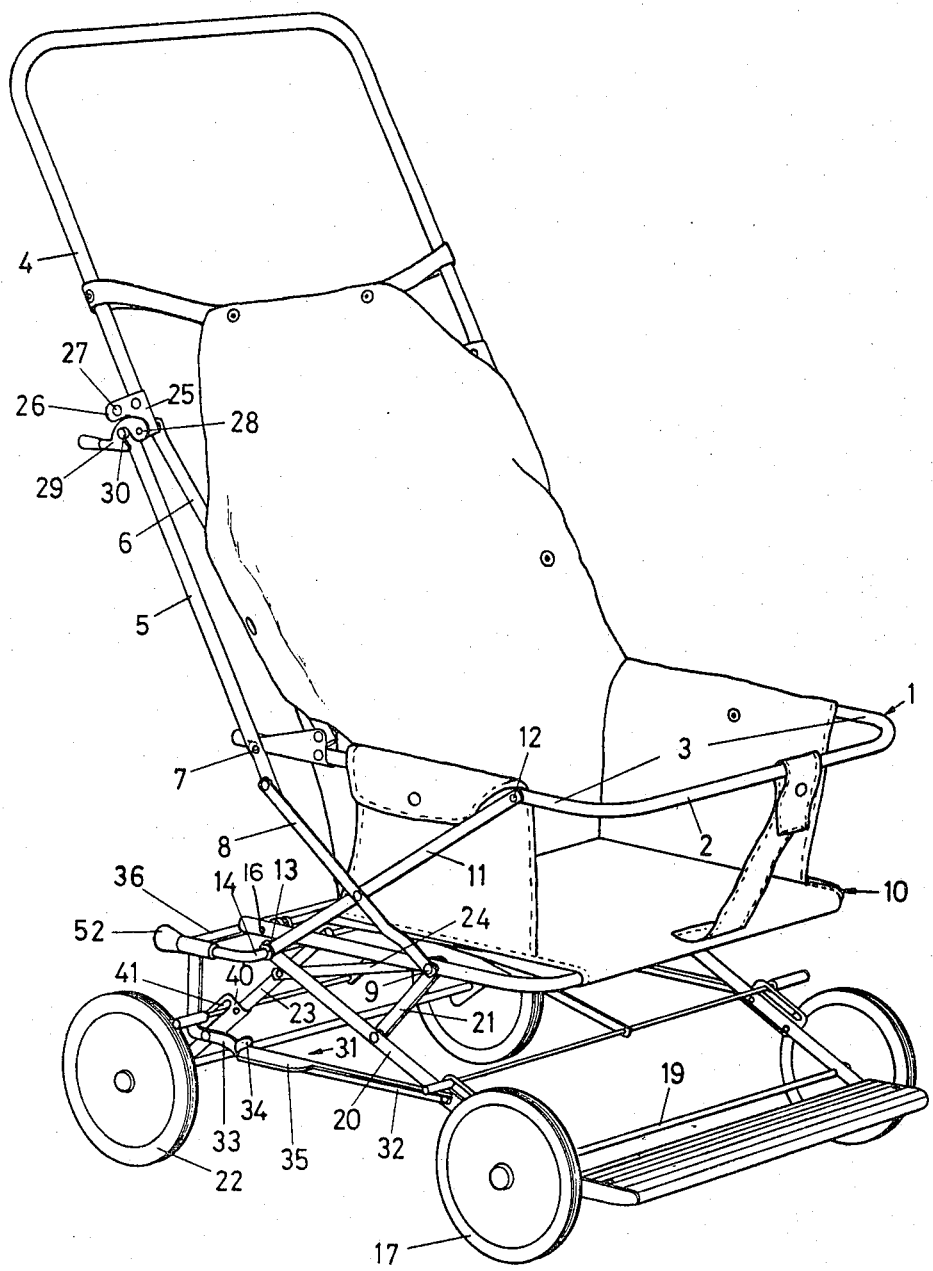
FIG. 1 is a perspective view of one form of the invention.
Figure 6:
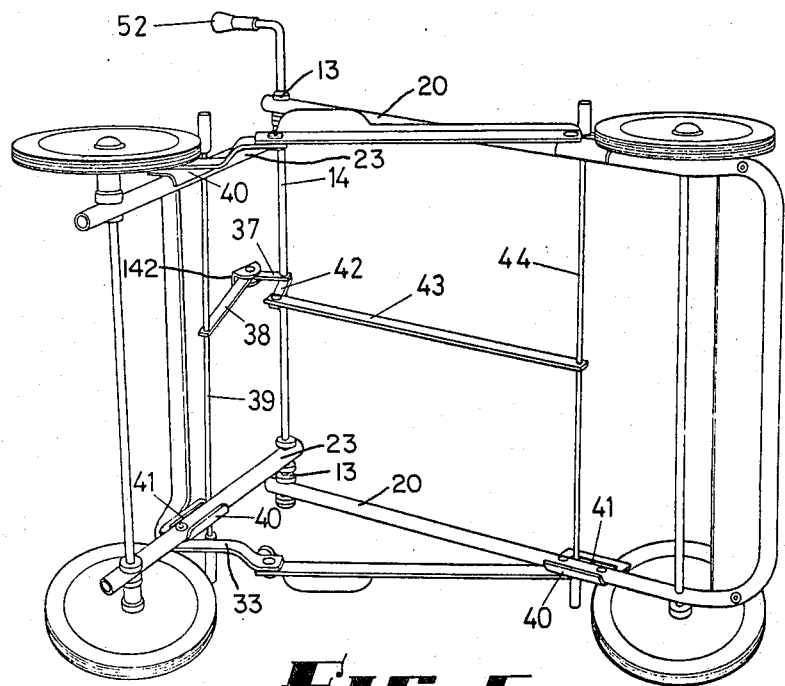
FIG. 6 is an underneath view showing the braking mechanism.
Figure 7:
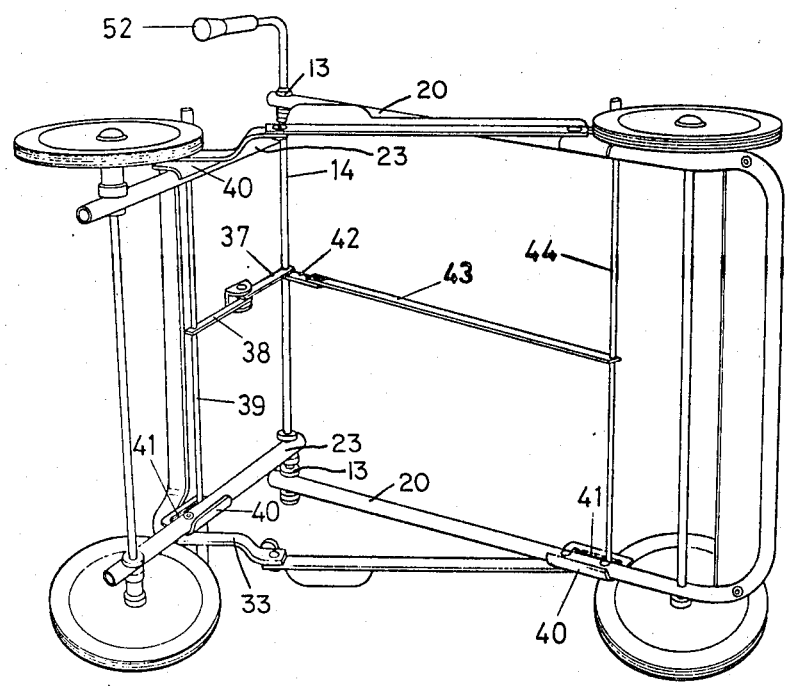
FIG. 7 is a similar view showing the brake in the off position.

The upper horizontal frame 1 can conveniently comprise a U-shaped frame having a horizontal bar 2 across the front on which the child may rest the hands and side bars 3. The handle has at its upper end a U-shaped handle-shaped structure 4, a lower handle link 5 and a lower handle portion 6. Handle portion 6 extends from the bottom of the upper portion of the handle 4 to the rear portion of the side bars 3 of upper frame 1, with handle link 5 extending to and pivoted at 7 to the side arms 3 rearwardly of link 6 and extending to the upper rear end of the arm 8 of the pantograph linkage, this linkage arm 8 being pivoted at this end to the handle link 5 and not to the upper frame 1.

This pantograph linkage arm 8 of the linkage is pivoted at 9 at its lower end to the forward end of the seat frame 10, and the other link 11 of the pantograph linkage is pivoted at 12 at its upper forward end to the side arms 3 of the upper frame 1, and at its other end extends past the seat frame 10 and is pivoted at 13 to a pivot rod 14 situated beneath the seat frame 10 and extending across the width of the stroller.

This pivot rod 14 is supported at 13 from the seat frame by a small seat frame link 15 which in the erected position of the stroller extends forwardly and downwardly from pivot 16 on the rear of the seat frame 10.

The front wheels 17 are carried on a frame 18 which includes an axle 19 joining the front wheels, and a pair of links 20 extending rearwardly and upwardly from the axle 19 to be pivoted to the pivot rod 13. The front wheel frame 18 is braced by a pin front bracing link 21 extending from the seat frame 10 at pivots 9 downwardly to the links 20 of the front wheel framework 18.

The rear wheels 22 are also supported and pivoted to the pivot rod 14 extending across beneath the rear of the seat frame 10, the rear wheel frame links 23 being located by a control link 24 extending from pivot 9 at the forward end of the seat frame 10 to the links 23 forming the rear wheel frame.

Thus in the erected position of the stroller, the stroller cannot fold or collapse under the weight of the child in the stroller, for the weight of the child tends to force the seat frame 10 toward the rod 14 on which the front 18 and rear wheel frames 23 are pivoted, thus tending to spread the wheels 17 and 22, but these being prevented from spreading by the bracing link 21 and control link 24.

Also when the stroller is collapsed, the seat frame link 15 pivots rearwardly about its pivot 16 to the seat frame 10, and thus pivot from its over centre position downwardly and then rearwardly causing the seat frame 10 to rise and the rear wheels 22 to move forwardly, but the weight of the child in the seat frame would prevent this movement from occurring when the stroller is in the erected condition.

On the lower portion of the upper handle 4 there is attached a bracket 25 to the arms 26 of which are pivoted by pivot 27 of the upper ends of the handle link 5.

The upper ends of the lower handle 6 are pivoted by pivot pins 28 to the bracket 25 below and in line with the upper handle 4. A latch 29 is pivoted to the pivot pins 28 and is adapted to engage the pin 30 to lock the upper handle 4 and the lower handle 6 and the handle link 5 together.

A locking mechanism 31 locks the wheels in the spread condition and comprises an over-centre locking latch having a front locking link 32 pivoted to the link 20 and a rear locking link 33 pivoted to the rear wheel frame 23, the two links 32 and 33 being pivoted together. The rear of the front link 32 is provided with a stop 34 so that the hinging is prevented just over centre. A locking plate 35 is provided so that by foot pressure on the plate 35 the links 32, 33 are moved to their locked over-centre position.

The links 33 on each side of the stroller extend beyond the links 23, extending upwardly to a cross-bar 36.

In order to collapse the stroller the latch 29 is released, and by pressing on the cross-bar 36, the locking links 32,33 brake as shown in FIG. 3, thus starting the collapsing or folding of the stroller. The rear of the upper portion of the handle then moves downwardly and the lower handle 6 and handle link 7 pivot forwardly about their pivots to the upper frame and the pantograph link.

When this occurs due to the pantograph linkage 8, 11 as the stroller is collapsed the upper frame 1 and seat frame 10 both tilt downwardly at their forward end and move slightly forwardly and collapse downwardly in a parallel motion arrangement, this movement through link 11 moving rod 14 and link 15 to swing rearwardly, the rear ground wheel control link 24 thus causing the rear wheel frame 23 to move forwardly as the link 15 moves rearwardly, the movement continuing until the rear wheels 22 are situated adjacent the front wheels 17 as shown through FIGS. 4 and 5.

In the collapsed position the frames 1 and 10 are virtually in contact with each other with the handle folded downwardly on top of the frame 1 and the rear wheels 22 folded forwardly underneath to adjacent the front wheels 17, with the seat frame 10 collapsing downwardly also.

Thus it will be seen that by merely grasping the handle and lifting that the stroller is automatically re-erected, and the locking clip can be placed in position over the lower portion of the handles.

In another form the rear wheel frame does not have an axle extending across between the two wheels, but can comprise a U-shaped bracket extending from each wheel upwardly to adjacent the rod to which it could be attached as by welding, this U-shaped bracket stabilizing the wheels, and allowing and providing a greater clearance so that there is no tendency of the users toes or feet to kick the rear axle.

With strollers and prams, one of the essential requirements of any braking system therefor, must be that the brakes must be firmly and positively applied, and that the brakes must not inadvertently release, such as by a child rocking backwards and forwards or bouncing in the pram or stroller.

Also the brakes while being positively applied, must be such that on actuating the braking handle or device by the user, that irrespective of the position of the wheel or wheels, that the brakes are applied.

It is known with some form of braking devices, where for example a rod or the like is inserted between the spokes of a wheel, that it can occur that the rod instead of being positioned between the spokes, hits one of the spokes and this prevents the rod from being inserted between the spokes, and thus while the user would assume that the brake has been applied, it is to be realised that the brake has not been applied and thus the stroller or pram or other carriage in which the child is sitting could easily roll away.

Pivot rod 14 in the preferred embodiment is utilized as an operating bar for the brakes, and the pivot rod 14 is adapted to be turned by a handle 52 in order to apply the brakes.

Attached to the centre of the pivot rod 14 is a crank 37 which extends generally rearwardly, to this crank 37 being pivoted a rear push rod 38 which extends downwardly toward the rear axle.

However at the end of the push rod 38 there is provided a rear brake rod 39, this rod extending across the stroller generally parallel to the rear axle, each end of the rod being adapted to engage a respective rear wheel 22 by pressing against the rolling surface of the wheel.

The brake rod 39 is guided in its movement by brackets 40 on the rear links, these brackets being provided with slots 41 so that it will be seen that on partial rotation of the pivot rod 14, that the crank 37 will push rod 38 down to force the rear brake rod 39 into contact with the tires of the rear wheels 22.

Preferably the pivot point between the crank 37 and the rear push rod 38 is by a known pivot lock 142 which allows the crank 37 and push rod 38 to go slightly over-centre to lock in that position. In this way the brake when applied is positively applied and can only be released by the rotation of the pivot rod 14 in the opposite direction to cause the crank 37 to pull upwardly to break the over-centre connection.

The rear brake rod 39 is preferably of metal, and so flexes slightly when the brakes are applied. Thus if one wheel is contacted by one end of the rod before the other, then the rod can flex to allow both ends to engage, and this flexing is sufficient to allow for any wear which can occur of the tires of the wheels, and also ensures that the brake is firmly applied.

In a similar manner the brakes can be applied to the front wheels 17, by having a further crank 42 extending from the pivot rod 14, this crank 42 connecting to a front push link 43 which engages centrally on a front brake rod 44 which also is guided in slots 41 formed in brackets 40 mounted on the front link 20, so that on turning the pivot bar by its operating handle, all four wheels are simultaneously applied.

It will be seen that this braking does not in any way affect the folding of the stroller, pram or the like to which it is applied, for the folding occurs about the pivot bar, and as the brake linkage is operated from this central pivot point, the linkage does not affect the folding of the carriage or framework at all.

In effect when the brakes are released, and the carriage is folded, the folding will cause the brakes to be applied, by a portion of the seat frame contacting the handle to move it to the braking position.

The ends of the brake rods can have applied thereto friction members, which can be pads or tubes of rubber adhered and fixed to the end of the brake rods, so that these frictionally engage the wheels and the tires.

Thus in the braking system there is a positive lock of the brakes, due to the slight over-centre arrangement of one of the linkages operating the brakes and it is a positive application of the brakes without relying on springs to apply the brakes, the flexing of the brake rods merely allowing pressures to be applied to the wheels and to accommodate for the wearing of the tires or wearing surface of the wheels.

Although the braking is shown as being applied to all wheels, it is to be realised that the braking may be applied to the rear wheels or to the front wheels only by utilising one crank and one brake rod only.

Figure 8:
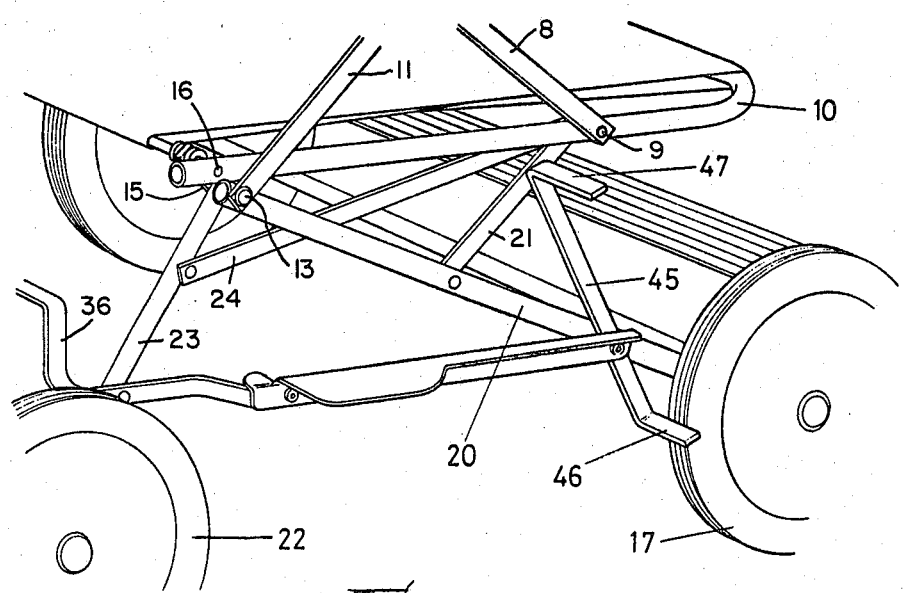

A further alternative is shown in FIG. 8 where an alternative form of braking system is shown. In this embodiment instead of there being braking applied to a pair or all the wheels, the braking can be applied to one wheel only.

As shown there is provided a brake lever 45 which is pivoted to a front frame link 20. The lever comprises a long arm and a short arm, with the short arm having a braking end 46 adapted to be moved into contact with a wheel 17. The longer arm of the lever has a turned over end 47 adapted to be moved manually either by hand or foot to engage and disengage the brake.

During folding of the carriage, the end 47 is contacted by the seat frame 10 to apply the brake. Thus on re-erection of the carriage the brake remains applied which is a safety feature, as the child is placed in the carriage or as the child crawls into the carriage itself. Hence after folding, the brake is already applied until removed.

Figure 9:
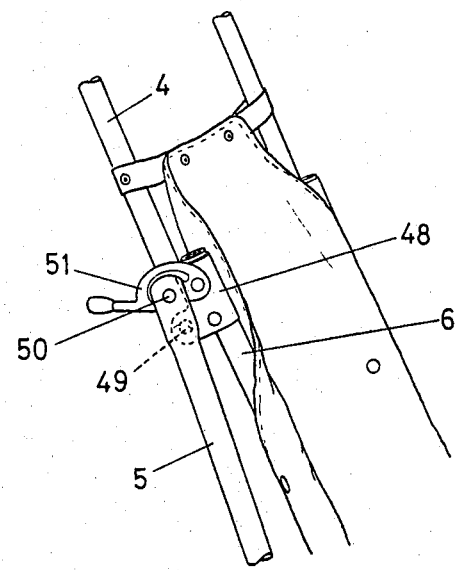
FIGS. 8 and 9 show an alternate form of the invention.

In FIG. 9 an alternative hinge arrangement is shown for the handle components. A bracket 48 is attached to the lower handle 6, the bracket having lugs or the like to which is pivoted the upper handle portion 4 by hinge pins 49. The handle link 5 is pivoted by hinge 50 to the upper handle portion 4 adjacent but spaced upwardly of the hinge pins 49. A locking hook 51 is adapted in the locked position to engage over the pin 50, the hook being pivoted to the upper portion of the lower handle 6.

While the invention has been described with particular reference to a child's stroller, it is to be noted that the invention is not limited thereto but may be incorporated in other folding carriages, such as prams, combination pram and stroller arrangements and the like.

Although various forms of the invention have been described in some detail it is to be realised that the invention is not limited thereto but is included in the definition of the appended claims.

I claim:

1. A child's stroller comprising an upper horizontal frame, a lower horizontal seat frame, a pantograph linkage connecting the said frames, an articulated handle connected to the upper frame and also to a first arm of the pantograph linkage, a second arm of the pantograph linkage connected to a first wheel frame having wheels, a second wheel frame having wheels and link means extending between and interconnecting said wheel frames, so that on collapsing said stroller said handle folds onto the upper frame and said upper frame moves in parallel manner to be adjacent said seat frame, said link means moving said first wheel frame wheels towards the second wheel frame wheels.

2. A child's stroller as defined in claim 1 characterised in that said first arm of said pantograph linkage is pivoted to the forward portion of said seat frame and to said second arm where the said arms cross, said second arm being pivoted to the forward portion of said upper frame.

3. A child's stroller as defined in claim 2 characterised in that said first wheel frame is suspended from a pivot rod by a seat frame link from the rear of the seat frame, said second arm of said pantograph linkage pivoted to said pivot rod, and said sevond wheel frame being pivoted to said pivot rod, a first bracing link extending from the forward portion of the seat frame to said first wheel frame, and a second bracing link extending from the forward portion of said seat frame to said second wheel frame.

4. A child's stroller as defined in claim 1 characterised in that said handle comprises an upper handle portion, a lower handle portion connected to said upper handle portion and pivoted to said upper frame, and a handle link connected to said upper handle portion and pivoted to said first arm of said pantograph linkage, whereby the upper handle portion folds rearwardly while said lower portion and handle link fold forwardly as stroller collapses to a folded condition.

5. A child's stroller as defined in claim 1 characterised by brake means adapted to brake a pair of wheels of said stroller, a pivot rod supporting said wheel frames beneath said seat, said pivot rod having a handle at one end, a crank intermediate the ends of said pivot rod, a push rod pivoted to said crank, said push rod being connected to a transverse brake rod centrally thereof adapted at its ends to engage said wheels by a controlled slide movement, whereby on actuation of said handle said push rod applies said brake rod to said wheels.

6. A child's stroller as defined in claim 1 characterised by brake means adapted to brake a pair of wheels of said stroller, said means including a transverse brake rod adapted to contact both wheels of said pair, a push rod attached to said brake rod to move said brake rod vertically to apply said brake rod to said wheels slotted guide members engaging said brake rod to guide its movement by said push rod, and means to move said push rod.

* * * * *